United States Patent [19]

Dietle

[11] Patent Number: 5,195,754

[45] Date of Patent: Mar. 23, 1993

[54] LATERALLY TRANSLATING SEAL CARRIER FOR A DRILLING MUD MOTOR SEALED BEARING ASSEMBLY

[75] Inventor: Lannie Dietle, Houston, Tex.

[73] Assignee: Kalsi Engineering, Inc., Sugarland, Tex.

[21] Appl. No.: 702,839

[22] Filed: May 20, 1991

[51] Int. Cl.⁵ .............................................. F16J 15/16
[52] U.S. Cl. ......................................... 277/27; 277/3; 277/97; 277/173; 175/107
[58] Field of Search .................. 277/3, 27, 173, 174, 277/176, 181, 182, 152, 235 A, 73, 116.8, 199, 198, 30, 205, 97-100; 384/479; 166/84; 175/107; 285/95, 96, 107, 109, 110, 113, 100, 101; 92/246

[56] References Cited

U.S. PATENT DOCUMENTS

| | | | |
|---|---|---|---|
| 2,992,052 | 7/1961 | De John | 92/246 |
| 3,365,202 | 1/1968 | Carleton | 175/107 X |
| 3,767,213 | 10/1973 | Cyphelly | 277/30 |
| 3,807,513 | 4/1974 | Kern et al. | 175/107 |
| 4,114,702 | 9/1978 | Maurer et al. | 175/107 |
| 4,246,976 | 1/1981 | McDonald, Jr. | 175/107 |
| 4,415,165 | 11/1983 | Martini | 277/27 |
| 4,484,753 | 11/1984 | Kalsi | 277/27 |
| 4,502,534 | 3/1985 | Roche et al. | 166/84 |
| 4,848,806 | 7/1989 | Miller | 277/27 X |
| 5,026,074 | 6/1991 | Hoes et al. | 277/27 |
| 5,031,923 | 7/1991 | Davies | 277/205 X |

FOREIGN PATENT DOCUMENTS

| | | | |
|---|---|---|---|
| 620578 | 8/1978 | U.S.S.R. | 175/107 |
| 494552 | 10/1938 | United Kingdom | 92/246 |

Primary Examiner—William A. Cuchlinski, Jr.
Assistant Examiner—Daniel G. DePumpo
Attorney, Agent, or Firm—James L. Jackson

[57] ABSTRACT

A sealing and lubrication assembly for rotating shafts intended for operation in an abrasive environment and wherein the rotary shaft may have lateral translation or excursion during its rotation. A housing receives the rotary shaft in bearing supporting relation and defines a lubricant chamber about the shaft. A seal carrier is movably positioned about the rotary shaft and has non-rotatable articulating or laterally translating relation with the housing. A high pressure rotary shaft seal is supported by the seal carrier and maintains bearing and sealing engagement with the rotary shaft during its lateral translation or excursion. The seal carrier is hydraulic force balanced and thus is not subject to pressure induced loads that might otherwise interfere with its articulation or lateral translation.

29 Claims, 2 Drawing Sheets

LATERALLY TRANSLATING SEAL CARRIER FOR A DRILLING MUD MOTOR SEALED BEARING ASSEMBLY

FIELD OF THE INVENTION

This invention relates generally to hydraulically powered drilling mud motors used for drilling into hard earth or rock formations, and more particularly, concerns a laterally translating seal carrier that greatly increases mud motor seal life by eliminating many adverse effects of the operating environment.

BACKGROUND OF THE INVENTION

When a vessel boundary is penetrated by a relatively rotating shaft, a rotary shaft seal is required to maintain the integrity of the vessel. In a typical piece of rotating machinery, the rolling element bearings require some form of oil bath lubrication, and the bearing housing members form a vessel to contain the lubricant and exclude contaminants. The oil field downhole drilling mud motor sealed bearing sub-assembly is an example of a particularly difficult rotary sealing application. Mud motor seals must perform under a combination of hostile conditions including high differential pressure across the seal, (as much as 1500 psi), high fluctuating levels of lateral shaft deflection, elevated temperature environment, geothermal heat and heat generated by bearings and seals, highly abrasive drilling fluid environment, limited lubricant reservoir volume, static shaft-to-housing misalignment, high levels of vibration, and axial shaft motion due to internal clearances and component elasticity. A viable mud motor seal implementation must have the ability to continue to perform its sealing function under the aforementioned hostile combination of conditions with low leakage and a long dependable service life. The mud motor, which is positioned at the bottom end of a drillstring during well drilling operations, is a positive displacement hydraulic motor that induces rotation of the drill bit against the earth formation being drilled. Mud motors are driven by the recirculating drilling fluid, which also functions to cool the drill bit and to flush drilling cuttings out of the well bore.

In high pressure abrasive liquid environment installations, such as in downhole mud motors, elastomeric shaft seals perform better if the extrusion gap between the shaft and the seal carrier is relatively small. If the extrusion gap is too large, the elastomeric seal material tends to bulge into the extrusion gap between the shaft and seal carrier due to the differential pressure between the internal lubricant and the external drilling fluid. Lateral movement of the shaft (due to side loads, runout, and bearing clearances) tends to pinch or "nibble" away at any seal material which protrudes into the gap; the resulting loss of seal material tends to shorten seal life. In practice the extrusion gap must be as small as practical to avoid extrusion nibbling of the material, but it must also be sufficiently large to avoid contact with the shaft. If the extrusion gap is sufficiently small that the seal carrier contacts the shaft, the seal carrier will assume part of the side load intended for the bearings and the resulting heat and friction will damage the elastomeric seal, the sear carrier, and the shaft. Seal carriers are usually integral to the bearing housing, or rigidly mounted to the housing. With such designs, the conflicting requirements (minimizing the extrusion gap while simultaneously avoiding shaft contact) require the maintenance of undesirably tight component tolerances.

A complete mud motor consists of three principal sub-assemblies: a hydraulic motor, a universal joint (U-joint), and a bearing assembly. Motor operation is relatively simple in principle concept. Circulating drilling fluid turns the rotor of the hydraulic motor. The U-joint transfers rotary motion from the rotor of the hydraulic motor to the bearing sub-assembly rotary shaft, to which the drill bit is threadedly connected. Weight is transferred from the drillstring to the drill bit via the thrust bearings of the bearing sub-assembly. As the drill bit rotates, it bears against and fractures the geologic formation by virtue of the weight on the bit, which is concentrated for that purpose by the cutting structure of the bit. The radial bearings of the bearing sub-assembly serve to orient and guide the bit with respect to the drillstring. In steerable drilling systems, a bent mud motor housing is used between the motor sub-assembly and the bearing sub-assembly. Directional control is accomplished by turning the drillstring momentarily to point the bent or angulated housing in the desired direction of travel. Straight ahead drilling is accomplished by continuous rotation of the drillstring. Bent housings place additional side loads on the bearing sub-assembly radial bearings during both the straight and the directional drilling modes, and in cooperation with high frequency variations in axial loading, contribute significantly to the high levels of fluctuating shaft deflection.

Seals are the weakest link in the mud motor sealed bearing sub-assemblies currently being used; the majority of bearing failures are preceded by failure of the lubricant seal which is intended to maintain the lubricant inside the sealed assembly and to prevent entry of abrasive contaminants into the lubricant chamber of the motor.

Many present-day mud motors still use unsealed, mud lubricated bearing assemblies because of the difficulties associated with successfully implementing a rotary seal which is capable of withstanding the unusually hostile conditions of the downhole drilling environment.

In unsealed bearing assemblies, the radial loads from the bit and the universal joint are carried by elastomer marine bearings, and the axial loads are carried by a custom stack of ball thrust bearings, often made from tungsten carbide to help resist the abrasive effects of the drilling fluid. Both the radial and the thrust bearings are cooled and lubricated by the diversion of a small portion of the circulating drilling fluid. Unsealed bearing sub-assemblies have a severely limited operating life, typically in the range of 50 to 100 hours of drilling activity, owing to baring wear. This limitation inflates drilling costs by requiring frequent trips out of the hole for motor replacement. Relatively high custom bearing replacement costs also add to the overall drilling costs. A substantial monetary savings could be realized if trips in and out of the hole for motor replacement were less frequent. Reduced motor maintenance costs are also desirable. These goals are starting to be realized by sealed bearing sub-assemblies which use conventional off-the-shelf bearings in a clean, lubricated operating environment.

Several types of radially compressed ring-shaped squeeze packing type seals are currently used to seal mud motor bearing assemblies. The most notable example is the patented, hydrodynamically lubricated, elastomeric shaft seals which are manufactured and sold by Kalsi Engineering, Inc., Sugar Land, Tex., under the registered trademark KALSI SEAL ®) Shaft seals manufactured by Parker and sold under the registered trademark PolyPak ® have also been employed, but with less success. At the present time, certain carefully implemented hydrodynamic seal installations in mud motors are routinely providing motor run times in excess of 160 hours with seals still effective; in other less carefully implemented installations seal failure may occur sooner. In a high pressure above ground Kalsi Seals shaft seal application where runout and shaft to housing clearances could be minimized, seal life in excess of 1000 hours has been reported from the field. The inner surface of a hydrodynamic Kalsi Seal type shaft seal has a unique, patented geometry that promotes increased seal life by lubricating the dynamic seal-to-shaft interfacial zone and by excluding drilling environment abrasives from the shaft sealing interface. The patented geometry incorporates a wavy, axially varying edge on the lubricant side of the inner diameter and a straight edge on the environmental side. As relative rotation takes place, the wave shape on the lubricant side, which has a gradually converging shape in the axial direction, generates a hydrodynamic wedging action that introduces a minute lubricant film between the seal and the shaft. This film physically separates the seal and the shaft, which prevents the typical dry rubbing type of wear and heat generation associated with a conventional non-hydrodynamic squeeze packing type seal and thereby prolongs seal and mating shaft surface life. The straight edge on the environmental side of the hydrodynamic seal identified by applicant's registered trademark Kalsi Seals is sharp cornered and does not generate a wedging action, and thereby helps to exclude particulate contaminants from the seal-to-shaft interface.

In conventional mud motor sealed bearing sub-assembly design, squeeze packing type seals, including Kalsi Seals ® type hydrodynamic shaft seals, are installed in a groove cut into the bore of a thru-hole provided for the shaft penetration of a housing member. In some cases the groove and thru-hole are integral with one of the bearing housings; in other cases they are part of a separate seal carrier housing that is rigidly mounted within the bearing housing. The groove diameter is sized so that the resilient sealing element is held in radial compression against the outside of the shaft. The resulting contact pressure initiates a seal between the resilient sealing element and its mating surfaces on the seal groove and shaft, and thereby maintains the integrity of the lubricant vessel.

All mud motor sealed bearing assembly housings are filled with bearing lubricant which is pressure balanced to the drilling fluid pressure in the drillstring bore by means of a pressure transmitting partitioning device such as a free-floating piston. The lubricant is retained within the housing by means of rotary sealing elements at each end of the housing. As the drilling fluid passes through the drill bit jets and enters the annulus of the well, its pressure drops to a level which is approximately 500 to 1,500 psi below the drillstring bore pressure. The bearing assembly seal arrangement therefore must withstand a 500 to 1,500 psi pressure drop between the bearing lubricant and the drilling fluid in the well annulus.

It is widely known that elastomeric squeeze type packings require a relatively small shaft-to-housing clearance gap in order to perform satisfactorily at elevated pressures, such as those found in typical mud motor operating conditions. Differential pressure across an elastomeric sealing element drives it against the wall on the low pressure side of the housing groove. As pressure increases, the elastomer tends to bulge into the shaft-to-housing clearance gap. The tendency toward protrusion is a direct function of the operating pressure differential and the size of the shaft-to-housing gap; larger gaps cause increased bulging. In extreme conditions, the seal material extrudes completely through the shaft-to-housing clearance gap by direct shearing action. Continuing loss of seal material ultimately leads to seal failure. The force which drives the shearing action is the differential pressure acting over the portion of the seal that is not supported by the seal groove wall. The key factors affecting direct extrusion are: shaft-to-housing clearance, differential pressure, and elastomer hardness. In less extreme conditions, the seal protrudes into the shaft-to-housing clearance gap, but does not fail by direct extrusion. Instead, cyclic strain, which results from normal pressure fluctuations and/or fluctuating extrusion gap size, causes the protruding material to break away from the sealing element. When this type of damage occurs, the damaged portion of the seal appears as if it has been nibbled away. This type of damage is a relatively common occurrence when elastomeric seals are used in high pressure rotary shaft applications.

For long-term moderate temperature 1,500 psi static (non-rotary) sealing applications using 90 durometer Shore A materials, various squeeze packing manufacturers recommend a maximum radial shaft-to-housing gap of 0.007- to 0.008-inch after taking into account tolerances, shaft-to-housing misalignment, and pressure distortion of the mechanical components. Smaller gaps are recommended for elevated temperatures. Several squeeze packing manufacturers give O-ring and X-ring installation recommendations for pressurized rotary applications The shaft-to-housing clearance recommendations for rotary applications are smaller than for static applications, presumably because of unavoidable elastomer softening resulting from seal generated heat. When rotation is present, the localized temperature at the rotary seal to shaft interface is always significantly higher than the ambient environment. In non-hydrodynamic squeeze packing shaft seals the seal generated heat is the result of direct seal to shaft rubbing, and is so severe that it can cause the elastomer to blister and melt. The self generated heat associated with hydrodynamic seals is less severe; but can still result in significant softening of the seal material, and consequently lower the pressure retaining ability of the seal. The heat generated by hydrodynamic seals is the result of shearing of the hydrodynamic lubricant film in the seal to shaft interfacial zone, and is not the result of heat generated by direct seal to shaft contact. Nevertheless, even with hydrodynamic seals, elastomer softening at the interface dictates that extremely close clearances be maintained in pressurized applications. The problem becomes more acute as rotational speeds and pressures are increased. In actual practice, mud motor rotating shafts are not precisely concentric to their housings, and in normal present day practice, shaft-to-housing clearances have to be adjusted accordingly so that there is sufficient clearance to prevent metal to metal contact between the shaft and the seal carrier. Mud motor shafts are prone to static misalignment with respect to the housing, and also to relatively large fluctuating lateral motions. The static misalignment results from diametric assembly clearances, non-perpendicular mounting shoulders, and eccentric mounting diameters resulting from normal tolerances. The dynamic lateral motion results from shaft deflection under fluctuating side loads, articulation within normal operating and assembly clearances, eccentricity and out-of-roundness due to normal production machining practices, and radial bearing stiffness under side loads. It is widely known that rotary shafts should not be permitted to rub their respective housings in squeeze packing seal arrangements, because the resulting friction can cause seal damage due to heat build-up as well as shaft and housing damage.

Detailed investigations by the inventor and his associates, which included finite element analysis, tolerance analysis, and trigonometric articulation analysis, show that mud motor shaft misalignment and dynamic lateral motion in the vicinity of the squeeze packings ordinarily exceeds standard industry recommendations for maximum radial shaft-to-housing clearance gaps for static, moderate temperature, 1,500 psi squeeze packing applications. This means that if the clearance is designed sufficiently large enough to prevent shaft-to-housing rubbing, the eccentric gap will be significantly greater than the industry recommendations for elevated temperatures.

Two distinct types of squeeze packing seal installations are currently being used, one which avoids metal to metal contact between the shaft and seal carrier by adjusting the size of the housing thru-bore, and one which permits such metal-to-metal contact. Many currently operational squeeze packing type sealed bearing mud motor sub-assemblies deliberately permit shaft-to-housing contact in order to maintain a relatively small shaft-to-housing clearance gap. The contact typically occurs at a bushing, which also defines the shaft-to-housing clearance in the vicinity of the seal.

When lateral shaft motions exceed the bushing-to-shaft clearance, the bushing assumes side loads that would preferably be borne by the rolling element bearings. As a result, a local build-up of heat occurs which is detrimental to the seal. The modulus of elasticity of the seal is lowered, which in turn lowers the pressure capability of the seal. The heat build-up also speeds up the compression set of the elastomer, thereby shortening the life of the seal. Local melting of the seal can also occur. The heavily loaded metal to metal rubbing contact also results in wear of the shaft and housing, and so increases the size of the shaft to housing clearance with direct detrimental results to the pressure bridging capacity of the sealing element. The resulting shaft wear is in the form of a localized, rough surfaced groove, with material deposits transferred from the housing bushing.

When relative axial motion occurs between the housing and the shaft as the result of internal assembly clearances and elasticity of the supporting components, the leading edge of the seal can become damaged from riding over the edge and roughened bottom surface of the groove. In some cases the combination of negative effects associated with this type of design can lead to premature failure. The alternate present day type of seal implementation, which is intended to prevent the problems associated with the aforementioned metal to metal contact, uses clearances which are substantially greater than the standard industry recommendations for static, moderate temperature 1500 psi applications. These relatively large clearances, in concert with relative motion caused by lateral shaft deflections, promote nibbling type damage to the shaft seal. At any given instant of operation, the clearance at a particular location is quite large and the elastomer readily protrudes into the gap; at the next instant, the gap closes and the protruding material is heavily compressed. The cyclic compression and relaxation eventually breaks off the protruding material and at the same time contributes to localized heat build-up, which exacerbates the extrusion problem. Therefore present day squeeze packing seal implementations which avoid metal to metal contact are limited in use to relatively low pressure differential mud motor applications. The current designs of the type which are intended to prevent shaft to carrier rubbing contact also attempt to minimize shaft misalignment by employing severe reductions of manufacturing tolerances and assembly clearances. This results in undesirably high manufacturing costs and unreasonably difficult assembly, but it still does not permit the type of minimum shaft-to-housing clearances that support the desired seal life at the upper limit of differential pressures encountered in drilling mud motors. Such designs also place the sealing element as close as possible to the rolling element bearings in order to minimize the lateral motion associated with articulation and deflection due to shaft overhang past the bearings. All bearings generate heat, however, and some sources recommend against placing squeeze type packings in close proximity to radial bearings for that reason.

Some published literature recommends "floating" seal housings for rotary applications when static shaft misalignment exceeds the shaft-to-housing clearance. The recommended floating housings consist of a ring which incorporates the rotary squeeze packing in a bore groove and a larger diameter static squeeze packing between the outside diameter of the floating seal carrier and the inside diameter of the bearing housing. This arrangement only "floats" to a very limited degree in pressurized applications, because once differential pressure occurs, the piston is forcibly held against its retainer by the axially acting hydraulically induced force which results from differential pressure acting over the hydraulic area between the rotary seal on the inside and the static seal on the outside of the carrier. The resulting friction between the carrier and its retainer greatly inhibits the ability of the carrier to float freely. Such designs are incapable of floating freely once differential pressure is applied, and can only float effectively in response to static misalignment prior to pressure introduction. Even that meager benefit is more or less negated by the fact that compression of the static seal on the outside diameter has a strong tendency to counteract any centering effect provided by compression of the rotary seal. The static seal is generally compressed to a higher degree than the rotary seal, and also has a larger circumference in compression, and therefore plays a correspondingly greater positioning role than the rotary seal. The lateral motion of the shaft has other detrimental effects on seal performance aside from the ones associated with shaft-to-housing clearance.

In well controlled high rotary speed, low pressure sealing tests, it has been repeatedly demonstrated that an elastomer sealing element cannot rebound quickly enough in response to minor shaft runout to prevent increased leakage. In recent controlled rotary seal experiments, it has been demonstrated that the leakage rate of high pressure elastomeric seals can sometimes increase dramatically with increased levels of shaft runout. It appears that the high friction of the elastomer, as it is forced against the low pressure gland wall by the high differential pressure, inhibits elastic rebound and causes undesirably high leakage rates. Lateral shaft motion of a similar or greater magnitude and frequency is to be expected in mud motor seal installations. These tests were performed in the absence of a drilling fluid operating environment; abrasive ingestion is distinctly possible when elastomeric rebound is inhibited, especially when dynamic axial shaft motion is simultaneously present.

Another problem related to mud motor shaft to housing lateral motion and misalignment involves seal compression. When a condition of eccentricity exists between the shaft and the seal gland, the radial seal compression decreases over approximately ½ of the seal circumference and increases on the opposite half. In order to insure that a fluid tight seal is maintained under such eccentric conditions, sufficient preliminary compression must be provided so that a sufficient level of compression is ensured in the offset condition. This usually results in a relatively high initial compression requirement when the lateral motion of mud motor shafts is being considered. Finite element analysis of the standard cross-section Kalsi Seal type hydrodynamic shaft seal under various levels of elevated temperature and compression indicate that distortion associated with high compression is undesirable. Increasingly high seal-to-shaft contact pressures are also associated with higher compression levels which result in undesirable increases in seal generated frictional heat and in running and startup torque.

Yet another problem related to mud motor shaft to housing lateral misalignment and motion involves wear of the bore and shaft in the close fitting region which defines the clearance between the shaft sealing surface and the housing member. The region is subjected to immersion drilling fluids which contain abrasive particulate matter, such as bentonite and cuttings broken from the formation by the drilling operation The drilling fluid, typically known as drilling mud, utilizes water and other liquid materials as a carrier constituent for the highly abrasive solid particulate matter. Due to the high ambient environmental pressures, and the constant relative motion, these abrasives are continually present in the closely fitting gap between the shaft and the seal carrier. When shaft lateral motion occurs, the shaft to housing clearance is reduced over approximately ½ of the circumference of the shaft, and as a result abrasives are trapped and crushed between the approaching surfaces of the shaft and housing. This crushing action causes serious wear to both the housing and the shaft, even though the shaft is usually coated with a hard surfacing material such as tungsten carbide. The housing wear causes the housing bore diameter to become larger which results in increased seal extrusion damage. The shaft wear is in the form of a localized, rough surfaced groove. When relative axial motion occurs between the housing and the shaft as the result of internal assembly clearances and elasticity of the supporting components, the leading edge of the seal can become damaged from riding over the edge and roughened bottom of the groove.

The present invention involves a seal implementation which successfully overcomes the problems enumerated above for an oil field downhole drilling mud motor high pressure seal, and provides a highly desirable squeeze packing seal implementation for many other types of difficult rotary sealing applications as well.

SUMMARY OF THE INVENTION

From the standpoint of the basic concept, the present invention involves a shaft sealing mechanism incorporating a laterally translating, squeeze packing type lubricated seal carrier for high pressure rotary shaft sealing applications such as oil field downhole drilling mud motor bearing assemblies, where high levels of fluctuating lateral shaft deflection are present. The seal carrier defines substantially equal pressure responsive areas at each axial extremity so that opposed pressure induced hydraulic forces acting axially on the seal carrier are substantially at net zero and thus the seal carrier remains free for lateral movement responsive to lateral excursion of the sealing surface of the rotary shaft. The seal carrier is force balanced regardless of the environmental pressure to which it is subjected. The invention is also efficiently functional through employment of a wide range of sealing elements including hydrodynamic rotary shaft sealing elements. The principle advantage of the invention is that it makes extremely close shaft to seal carrier clearances possible, while at the same time avoiding direct rubbing contact between the relatively rotating shaft and the seal carrier. Another major advantage of the invention is the virtual elimination of relative lateral motion between the shaft and the seal carrier. These advantages, along with others which will be explained shortly, make the rotary seal highly resistant to extrusion damage, and significantly reduces its leakage rate. As a result, the life and pressure capability of the seal are extended well past that of currently employed rotary shaft seal implementations.

According to the teachings of this invention, the rotary shaft seal is mounted in a seal carrier which is separate from the bearing housing. Sufficient clearance is provided between the outside of the seal carrier and the inside of the bearing housing so that the end of the seal carrier which houses the rotary seal can move laterally in response to static shaft misalignment and dynamic lateral motion. The end of the seal carrier which houses the rotary seal is centered on the shaft by the compression of the rotary shaft seal. This is in significant contrast to other present day mud motor seal carrier designs where the radial location of the seal carrier rotary shaft seal gland in respect to the shaft is dictated by the seal carrier's fit with the bearing housing, and by the mounting fits and internal clearances of the radial bearings, and by all related component tolerances.

In other present day mud motor seal implementations the seal carrier or housing positions the seal; according to the present invention the seal is free to follow lateral movement of the rotary shaft and thus positions the seal carrier housing relative to the rotary shaft. One end of the seal carrier houses a resilient circular squeeze packing type sealing member which establishes a circular sealing interface with the relatively rotating circular sealing surface of the shaft and serves as a radial bearing to concentrically locate that end of the seal carrier with respect to the shaft. This permits close carrier to shaft clearances without danger of physical contact between the relatively rotating members. The opposite end of the seal carrier establishes a circular sealing interface with a member of the non-relatively rotating housing and concentrically locates that end of the seal carrier with respect to the housing member via a circular squeeze packing type seal which may be mounted in either the housing member or the carrier. Both sealing interfaces are substantially the same diameter, so that there can be no substantial axial hydraulically induced force imposed on the carrier by differential pressure acting across the seals. The resiliency of the seals permits the carrier to articulate in unison with lateral shaft deflection in response to forces transmitted to it from the shaft by the rotary seal, and thereby eliminates the need for large shaft to housing clearances to accommodate the motion.

The laterally translating seal carrier concept of this invention provides a squeeze packing gland which readily follows rotary shaft vibration, deflection and runout, thereby effectively eliminating relative lateral motion between the carrier, seal, and shaft. Elimination of said relative lateral motion permits the extremely close, non-varying clearances between the shaft and carrier which are necessary to prevent high pressure extrusion damage to the squeeze packing seal Elimination of such relative lateral motion also eliminates the high lubricant leakage rates which are associated with the inability of the compressed elastomeric sealing element to rebound with sufficient speed to follow rapid lateral shaft motion. Elimination of relative lateral shaft/carrier motion also prevents inadvertent contact between the rotating shaft and non-rotating seal carrier which can result in high levels of friction and heat that may cause damage to the carrier and shaft, and failure of the sealing element. Even further, elimination of relative lateral shaft/carrier motion also helps to minimize abrasive wear of the carrier and shaft which can be caused by abrasives entrapped between closely fitted relatively rotating parts.

The geometry of the seal carrier mechanism of this invention also places the elastomeric seals in a position which is remote from bearing generated heat.

An advantage of the invention is that the maximum amount of positional eccentricity that can exist between the diameters which control the extrusion gap is controlled by just two mechanical factors: the cross sectional variability of the seal itself as controlled by its radial tolerance, and the eccentricity between the seal groove and the bore of the seal carrier. Manufacturing experience with these two variables has shown that their contribution to shaft-to-carrier eccentricity is minimal. As a result, the maximum radial shaft-to-housing clearance of this design can be well within standard squeeze packing anti-extrusion guidelines.

Another advantage of the invention is that seal compression can be relatively moderate since the seal centers itself and its gland with respect to the circular shaft sealing surface. The static sealing interface between the seal carrier and the bearing housing is the same approximate diameter as the rotary shaft seal. This arrangement balances the hydraulic forces acting axially on the seal carrier axially so that, unlike prior art "floating" seal carrier squeeze packing, implementations designs, the carrier is unrestrained by axial differential pressure related hydraulic forces, and the rotary seal end of the carrier is free to move laterally in unison with the shaft even when high differential pressures are present across the seals. Small differences in sealing diameter can, however, be used when necessary to effectively preload the seal carrier against axial motion when severe vibration is present. In such cases, the hydraulic area is sized to exert an axial hydraulic force which is approximately equivalent to the weight of the seal carrier times the anticipated g-forces of the installation. In most cases this preload is not necessary because of the dampening effect of the squeeze packing seal friction.

Laboratory tests have shown that moderately compressed squeeze packing seals can transfer substantial side loads from the shaft to the seal carrier. This phenomenon assures that as the shaft moves laterally the rotary seal end of the seal carrier moves in unison with it. The static sealing end of the carrier is centered in respect to the housing member by the compression of its seal. Although the shaft-to-housing clearance is quite small at both the static seal and the rotary seal, the engagement length is also relatively small. As a result there is a more than adequate metal to metal clearance to permit the seal carrier to articulate in response to lateral shaft movement.

At one end, the seal carrier pivots on the static seal; at the other end the rotary shaft seal serves as a very capable shaft-to-seal carrier radial bearing. Because the seal carrier pivots in response to shaft movement and initial misalignment, the shaft-to-housing clearance can be much smaller (without shaft-to-housing contact) than is otherwise possible in a non-pivoting arrangement. This advantage over conventional seal implementations gives the invention a substantial improvement in terms of pressure capacity and overall life.

One additional advantage of the articulation of the seal carrier is that the seal and the mating circular sealing surface go through a very similar angular change when shaft deflection occurs. This means that the circle of contact between the seal and the shaft surface remains at nearly at right angles to the axis of the shaft; rather than becoming skewed during shaft deflection as is the unavoidable case in non-laterally translating designs. The advantage this gives the invention is that there is virtually no sweeping action taking place on the environmental side of the seal, and the tendency for wear due to said sweeping action is greatly reduced.

It should also be pointed out that since there is virtually no lateral relative motion between the seal carrier and the shaft, there is a corresponding reduction in the type of shaft and housing wear related to the crushing of abrasive particulate matter between a relatively moving shaft and carrier.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

In the Drawings

FIG. 1 is a longitudinal sectional view of the lubricated bearing and sealing mechanism for a drilling mud motor which bearing and sealing mechanism is constructed in accordance with the teachings of the present invention.

FIG. 2 is a fragmentary sectional view of the hydraulic force balanced shaft sealing assembly portion of FIG. 1 with the structural components thereof being shown in detail.

FIG. 3 is a fragmentary sectional view of a hydraulic force balanced rotary shaft sealing mechanism representing an alternative embodiment of this invention.

DETAILED DESCRIPTION OF THE PREFERRED EMBODIMENT

Figure 1:
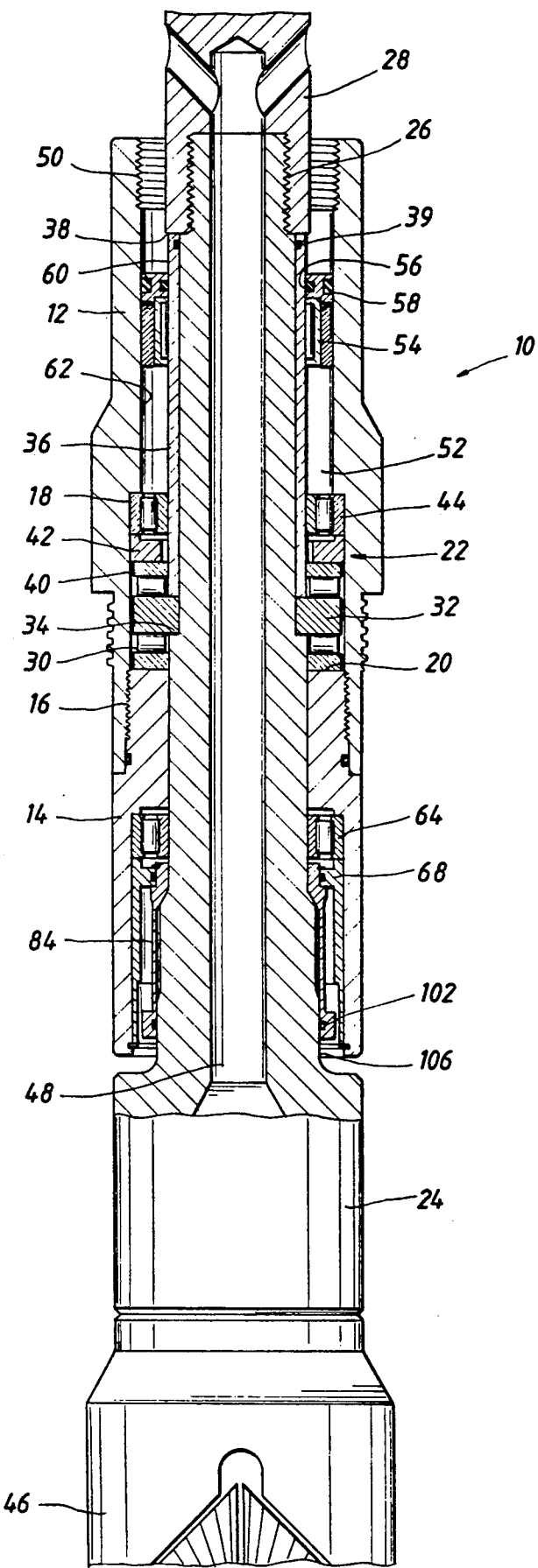

Referring now to the drawings and first to FIG. 1, there is shown generally at 10 by way of a longitudinal sectional view, the sealed bearing sub-assembly portion of an oil field downhole drilling mud motor. The sealed bearing sub-assembly 10 incorporates housing means of generally tubular form having upper and lower housing sections 12 and 14 respectively, having sealed threaded interconnection at 16. The upper and lower housing sections define opposed internal shoulders 18 and 20 respectively that function to position a bearing assembly shown generally at 22 within the housing. The bearing assembly provides rotatable bearing support for a drill bit drive shaft 24 which extends in rotatable relation through the housing and has driven threaded connection 26 with a universal joint 28 that is in turn driven by the rotor output shaft of the hydraulic mud motor mechanism.

The bearing assembly 22 includes an off-bottom thrust bearing 30 which is seated against the thrust shoulder 20 and which provides rotatable support for a thrust washer 32 which has an internal diameter portion thereof seated against an upwardly directed on-bottom thrust shoulder 34 of the rotatable shaft 24. The off-bottom thrust bearing 30 resists off-bottom thrust loads which develop due to differential pressure acting across the pressure responsive sealing area defined by the high pressure seal. The thrust washer 32 is retained in position against the on-bottom thrust shoulder 34 by means of an elongate tubular load transfer sleeve 36, having its lower end in abutting engagement with the thrust washer and its upper end in engagement with a downwardly directed off-bottom shoulder 38 of the universal joint 28. The load transfer sleeve is sealed with respect to the rotatable shaft 24 by means of a circular sealing element 39 to prevent leakage of lubricant through the interface between the sleeve and shaft. An on-bottom thrust bearing 40 is disposed in engagement with the thrust washer 32 and is secured in position by a thrust member 42 that is in turn positioned and supported by the structure of an upper radial bearing 44 that is seated against the downwardly directed bearing positioning shoulder 18.

A drill bit 46 is threadedly (not shown) secured to the lower end of the rotatable shaft 24 and receives drilling fluid via a central drilling fluid supply passage 48 of the rotatable shaft. As mentioned above, the drilling fluid is employed for cooling the drill bit during its operation and for flushing away drill cuttings that occur as the geological formation is cut away by the drill bit. The drilling fluid is also employed as a weighting medium to provide sufficient bottom hole pressure to overcome any liquid or gas pressure that might be encountered as production zones are intersected by the drill bit. The drill bit 46 is provided with a plurality of cutter teeth which are typically formed of tungsten carbide or other suitable materials and which cut away the formation as the drill bit is rotated by its drive shaft 24. The drill bit 46 and its cutter teeth may take any one of a number of suitable forms without departing from the spirit or scope of this invention.

During on-bottom operation, the drilling thrust loads are transferred from the drill bit 46 to the on-bottom thrust bearing 40 by the on-bottom thrust shoulder 34 of the rotatable shaft 24. The on-bottom thrust loads are transferred to the bearing positioning shoulder 18 of the upper bearing housing 12 by the on-bottom thrust bearing 40 either directly or via some intermediate member, such as the outer race of the upper radial bearing 44. The thrust loads are then transferred to the hydraulic motor housing (not shown) by the threaded connection 50 that is provided at the upper end of the upper bearing housing 12. The thrust bearings of the shaft, and their respective load paths, may take any one of a number of suitable forms without departing from the spirit and scope of this invention.

The bearing housing defined by the upper and lower bearing housing sections 12 and 14 is of greater internal diameter than the outer diameter of the rotatable shaft 24 and thereby define an annulus 52 which serves as a lubricant chamber to contain a volume of lubricant that is employed for lubricating the bearing assembly. To prevent contamination of the lubricant by the abrasive drilling fluid which represents the hostile operational environment for the motor, an axial floating piston 54 is movably positioned within the annulus 52 to function as a floating partition to separate the drilling fluid and lubricant. This floating piston incorporates inner and outer resilient seals 56 and 58 respectively which establish sealing engagement with respective cylindrical sealing surfaces 60 and 62 of the sleeve 36 and housing 12.

It should be born in mind that the particular rotary shaft bearing assembly that is illustrated in the drawings and described herein is not intended to limit the spirit and scope of the present invention. Bearing assemblies of other type and character may be employed without departing from the spirit and scope hereof.

In all mud motor sealed bearing sub-assemblies a lubricant sealing element is employed at the location where the rotatable shaft extends from the lower housing member in order to retain lubricant for lubrication of the bearings and to exclude environmental contaminants such as drilling fluid particulate abrasives, from the bearings.

Figure 2:
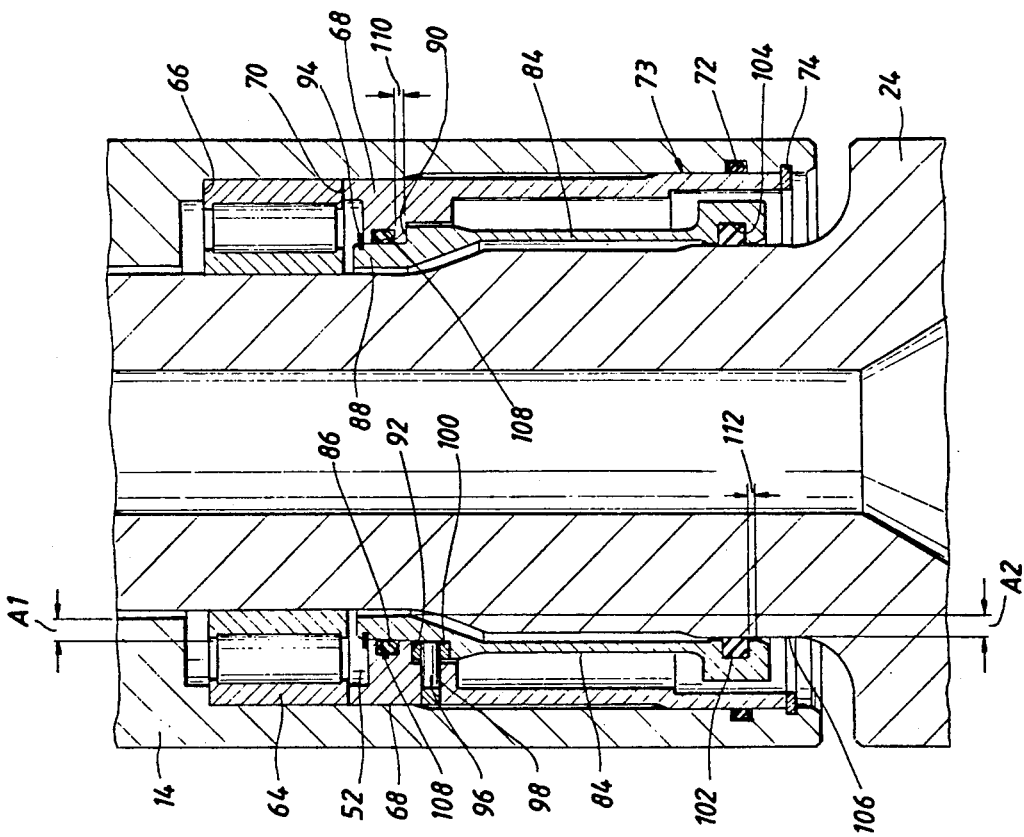

Referring now to FIG. 2 there is shown a fragmentary enlarged sectional view of the high pressure seal region of the bearing sub-assembly illustrated in FIG. 1. Within the annular space or annulus between the lower bearing housing 14 and the rotatable drill bit drive shaft 24 there is positioned a lower radial bearing 64 which is seated against a downwardly directed internal bearing positioning shoulder 66 of the lower bearing housing. A seal pilot 68 is also positioned within the annulus between the shaft and housing with its upper end 70 disposed in positioned engagement with the lower radial bearing. The seal pilot member is of elongate, generally tubular construction and is sealed with respect to the housing by means of a circular squeeze packing sealing member 72. The pilot is retained against axial movement within the housing by means of a circular retaining ring 74.

A laterally translating seal carrier element 84, also of elongate, generally tubular construction is received in sealed movable assembly with the pilot 68. The seal carrier is sealed with respect to the pilot by means of a circular, non-rotary squeeze-type sealing element 86 which is retained within a circular seal groove formed in an inner peripheral portion of the pilot. The seal carrier defines an upper generally cylindrical extension 88 that is received in close fitting relation within the upper inner peripheral portion of the pilot and which maintains the seal 86 under sealing compression. The seal carrier defines an upwardly directed positioning shoulder 90 which engages a corresponding downwardly directed positioning shoulder 92 of the pilot. The positioning shoulder 92 restrains upward movement of the seal carrier relative to the pilot. A circular retainer ring 94 received within an external retainer groove of the upper portion of the seal carrier, limits downward movement of the seal carrier relative to the pilot. It is also necessary that a non-rotatable relationship be established between the pilot and the seal carrier. This is accomplished by means of a radial pin or other means 96 which is received within a transverse opening in the pilot and engages within an external receptacle 100 of the seal carrier. After positioning of the anti-rotation pin 96, the radially outer portion of the bore 98 can be closed by a welded or threaded plug. The seal carrier, because of its uniquely sealed, movable relationship with the pilot 68, is permitted articulation and lateral translation which will be discussed in detail hereinbelow. At the lower end of the seal carrier 84 is provided seal means in the form of a resilient high pressure rotary sealing element 102 which is retained within an internal seal recess 104 and has an internal sealing periphery that establishes sealing engagement with a cylindrical sealing interface surface 106 of the rotary shaft 24. The resilient sealing element 102 is in the form of a squeeze-packing seal and has a relationship with the seal carrier such that a minimal extrusion gap is defined between the cylindrical sealing interface surface and the inner periphery of the seal carrier. Further, the sealing element 102 may conveniently take the form of the patented hydrodynamic seal manufactured and sold by Kalsi Engineering, Inc. or any one of a number of rotary shaft seals that are suitable for the purposes intended.

It is desirable that the laterally translating seal carrier 84 be pressure balanced to permit its freedom of movement. The relative diameters of the sealing interface diameter 108 of the laterally translating seal carrier 84 and the sealing interface diameter of the cylindrical sealing interface surface 106 of the rotary shaft are deemed critical to the performance of the present invention. The two sealing interface diameters must be substantially identical in diameter, so that no significant hydraulic area exists between the two sealing interface diameters defined by the dynamic seal 102 and the static seal 86 over which differential pressure could act to generate an axial hydraulic force. The pressure balancing feature of this invention is illustrated in the preferred embodiment of FIG. 2. In FIG. 2 pressure acts downwardly on seal carrier area "A1" defined by the sealing interface of seal 86 with the cylindrical sealing surface 108 of the seal carrier and develops a resultant pressure induced force acting axially on the seal carrier. Conversely, the same pressure also acts upwardly on pressure responsive area "A2" of the seal carrier which is defined by the sealing interface of seal 102 with the cylindrical sealing surface 106 of the shaft 24 and develops a pressure induced resultant force acting axially in the upward direction on the seal carrier and opposing the pressure induced force acting downwardly on pressure responsive area "A1". Since the areas A1 and A2 are substantially identical these opposing upwardly and downwardly acting pressure induced forces substantially cancel out; thus the net axially induced pressure responsive force acting on the seal carrier is substantially zero. The seal carrier is substantially pressure balanced and is therefore freely movable, so that it will readily follow lateral excursions of the shaft sealing surface 106 as the shaft rotates. Since substantially no hydraulic area exists between these two sealing interface diameters, the laterally translating seal carrier 84 is hydraulic balanced so that regardless of the magnitude of the differential pressure acting across the rotary seal 102 and the non-rotary seal 86, no substantial axial hydraulic thrust is imposed on the laterally translating seal carrier. If a substantial hydraulic area did in fact exist between the rotary seal 102 and the non-rotary seal 86, as is common with present day mud motor squeeze packing type seal implementations, the resulting differential pressure induced, axially acting hydraulic force could hold the seal carrier forcibly against its retainer, as described previously in the discussion of the prior art. This relatively large hydraulic force causes significant friction between the seal carrier and its retainer, which greatly inhibits lateral motion of the seal carrier. This friction effectively holds the carrier in place so that it cannot freely allow the lateral motion of the shaft. It should be pointed out that a slight difference in diameter between the carrier to shaft sealing interface 106 and the carrier to pilot sealing interface 108 can be employed to preload the carrier in one axial direction or the other in order to stabilize it in applications which have severe axial vibration. The important point of the present invention is that the resulting pressure induced axial hydraulic loads are relatively small in comparison to the radial bearing capacity of the rotary shaft seal 102, and do not inhibit the ability of the seal carrier 84 to articulate in unison with the lateral motions of the shaft sealing surface 106.

Clearance is provided between the sealing interface diameter 108 of the laterally translating seal carrier 84 and the mating bore of the pilot 68 in the vicinity of the non-rotating seal 86, so that angular articulation may take place between the pilot and the laterally translating seal carrier without radial metal-to-metal contact between the seal carrier and the pilot. This clearance is kept to a minimum on the environmental side of the non-rotating seal 86, commensurate with the relatively high differential pressure that exists between the bearing lubricant in lubricant chamber 52 and the drilling fluid on the opposite side of the seal 86, so as to prevent extrusion damage to the non-rotating seal 86. Even though the seal carrier/shaft clearance is relatively small, a substantial amount of articulation is possible owing to the relatively short length of the longitudinal engagement 110. Clearance is also provided between the sealing interface diameter 106 of the shaft 24 and the mating bore of the laterally translating seal carrier 84 in the vicinity of the rotary seal 102, so that angular articulation may take place between the shaft 24 and the laterally translating seal carrier 84. This clearance is kept to a minimum on the environmental side of the rotary seal 102, commensurate with the relatively high differential pressure that exists between the lubricant in the lubricant chamber 52 and the drilling fluid on the opposite side of the rotary seal 102, so as to prevent extrusion damage to the rotary seal. Even though said clearance is relatively small, a substantial amount of articulation is possible owing to the relatively short length of longitudinal engagement 112.

The sealing interface diameter 108 at the upper end of the laterally translating seal carrier 84 is positioned concentrically with respect to the bore of the pilot 68 by the resilient, non-rotating squeeze type packing seal 86. The bore of the pilot 68, the sealing interface diameter 108 of the laterally translating seal carrier 84, and the radial cross-section of the squeeze packing 86, are dimensioned and toleranced so that contact can not occur between the sealing interface diameter 108 of the laterally translating seal carrier 84 and the mating bore of the pilot 68, even when anticipated levels of articulation are present between the laterally translating seal carrier and the pilot. It should be noted that other types of flexible static seals, such as metal bellows, can also be used to provide a seal between the laterally translating carrier and the pilot without departing from the spirit or scope of this invention. The bore at the lower end of the laterally translating seal carrier 84 is positioned concentrically with respect to the sealing interface diameter 106 of the shaft 24 by the resilient, squeeze type packing seal 102. The bore of the laterally translating seal carrier 84, the sealing interface diameter 106 of the lower shaft 24, and the radial cross-section of the resilient squeeze packing 102, are dimensioned and toleranced so that contact can not occur between the sealing interface diameter 106 of the shaft 24 and the mating bore of the laterally translating seal carrier 84, even when anticipated levels of articulation are present between the laterally translating seal carrier 84 and the shaft 24

In practice, when the lower portion of the shaft 24 deflects laterally, the rotary seal 102 serves as an ample radial bearing between the lower shaft 24 and the laterally translating seal carrier 84 and functions to force the lower, rotary seal 102 end of the laterally translating seal carrier 84 to precisely follow the lateral motion of the lower shaft 24 and thus causes the laterally translating seal carrier 84 to pivot at the sealing interface which exists between the laterally translating seal carrier and the pilot. The radial load bearing capacity of the rotary seal 102 is amply sufficient to overcome the sliding resistance of the non-rotating seal 86 as it bears against the mating sealing interface diameter of the laterally translating seal carrier. Owing to the relatively high radial load bearing capacity of the rotary seal 102, no significant relative lateral motion occurs between the laterally translating seal carrier and the lower shaft during the articulating action, and as a result metal to metal contact between said components, and the accompanying potential for damage to the components and to the seal 102, is avoided. This lack of relative motion also helps to prevent nibbling type extrusion damage to the static seal.

A substantial differential area exists between the housing 14 to pilot 68 sealing interface and the pilot 68 to laterally translating seal carrier 84 sealing interface, and as a result the differential pressure acting over this differential area causes a considerable axial force; this force being reacted to the housing by the retaining ring 74. Any one of many suitable alternate retaining devices or methods, such as threads or integral retainer structure, may be employed without departing from the spirit or scope of this invention. As the shaft 24 rotates, the breakout and running friction of the rotary seal 102 imparts torque to the laterally translating seal carrier 84. Relative rotation between the laterally translating seal carrier and the pilot 68 is prevented by a radial pin 96 which engages a mating slot in the outside of the laterally translating seal carrier 84. Any one of a number of suitable alternative anti-rotation devices, such as lugs or static seal friction, may be employed without departing from the spirit and scope of this invention.

As the shaft 24 rotates, the breakout and running friction of the rotary seal 102 imparts torque to the pilot 68. Relative rotation between the pilot and the lower bearing housing 14 is prevented by the frictional resistance of the static squeeze packing seal 72 between the bore of the housing 14 and the outside diameter of the pilot 68, and by the friction between the pilot 68 and the retaining ring 74, and the retaining ring and lower bearing housing, which results from the unsupported pressure load acting across the inner 108 and outer 73 pilot sealing interfaces. Any one of a number of suitable alternative or auxiliary anti-rotation devices, such as radial pins, may also be employed to prevent rotation of the pilot without departing from the spirit and scope of this invention.

Figure 3:
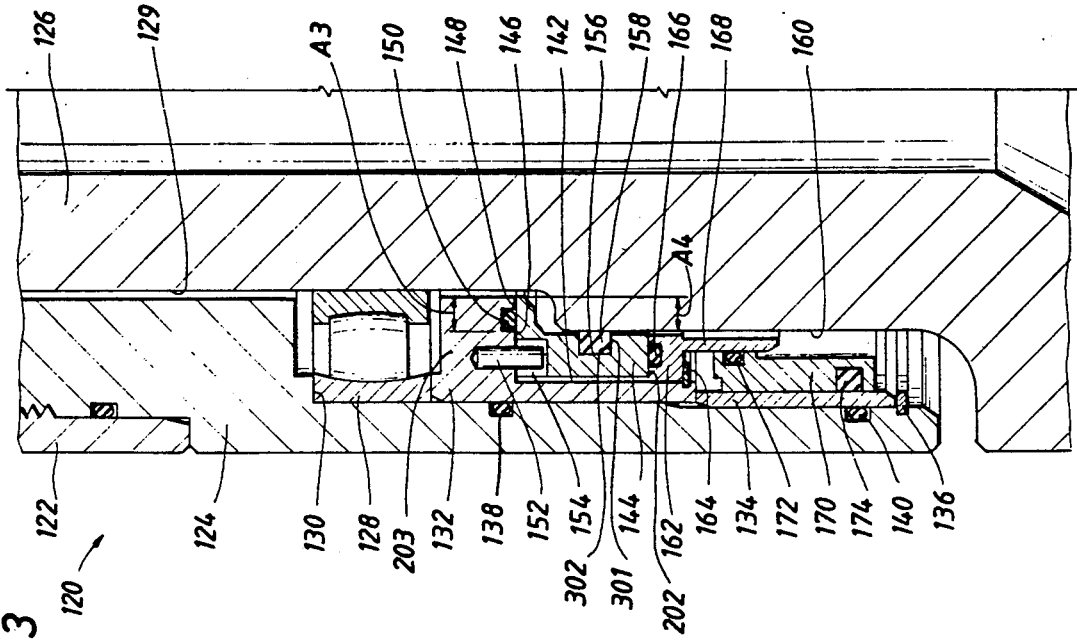

Referring now to the fragmentary sectional view of FIG. 3, an alternative embodiment of the present invention is illustrated. A bearing and shaft seal assembly is provided which incorporates a housing structure similar to that shown in FIG. 1 and including upper housing section 122 and lower housing section 124. A rotatable drill bit drive shaft 126 also similar to that shown in FIG. 1 and FIG. 2, is supported for rotation within the housing by an upper bearing assembly of the nature shown in FIG. 1 and by a lower radial bearing 128 which is seated against a downwardly directed locating shoulder 130 defined by the lower housing section 124.

A pilot member 132 of generally tubular construction is positioned within the lower housing section with the upper end thereof in abutment with the radial bearing 128. The pilot member 132 is secured against downward axial movement by means of a tubular spacer member 134 which is in turn retained by a circular retaining ring element 136 that is located within an internal retainer ring groove formed within the lower housing section 124. The pilot 132 is sealed with respect to the lower housing section 124 by means of a circular squeeze packing type resilient sealing element 138 which is retained within an internal seal groove of the lower housing section 124. (Alternatively, the squeeze packing sealing element could be housed in the pilot.)

The pilot member defines a seal carrier recess 142 within which is located a laterally translating seal carrier 144 disposed in sealed laterally movable assembly with the pilot 132. The pilot member 132 forms a lateral surface 146 defining a component surface of the seal carrier recess 142. The lateral surface 146 is disposed in substantially normal relation with the longitudinal axis of the rotary shaft 126. The lateral surface 146 also serves as a downwardly facing locating shoulder in terms of restraining upward movement of the laterally translating seal carrier 144 relative to the pilot 132. The laterally translating seal carrier 144 also forms a smooth lateral sealing surface 148 which is disposed for sealing engagement with a circular squeeze packing type sealing member 150 that is retained within an annular seal groove formed in the pilot member 132. The seal carrier is maintained in non-rotatable relation with the pilot 132 by means of one or more anti-rotation pin members 152 of the pilot which is received within one or more recesses 154 of the seal carrier. The seal carrier further defines a circular internal seal recess 156 having a squeeze packing type high pressure rotary sealing member 158 located therein and establishing sealing engagement with a cylindrical sealing surface 160 of the rotary shaft 126.

As the shaft 126 is rotated relative to the bearing housing 124, its cylindrical sealing surface 160 is susceptible to lateral excursion for the various reasons set forth hereinabove, including bit side loads, operating and assembly clearances, and imperfect shaft machined surfaces. The seal carrier, because of its uniquely sealed, axially fixed but laterally movable relationship with the pilot 132, can translate laterally in concert with lateral shaft motion, as will be discussed in detail hereinbelow. During such lateral excursions of the laterally translating seal carrier 144, the high pressure seal member 150 effectively maintains its sealing engagement with the lateral sealing surface 148 of the seal carrier by sliding upon said surface.

The bore of the laterally translating seal carrier 144 is positioned concentrically with respect to the sealing interface diameter 160 of the shaft 126 by the resilient, squeeze type packing seal 158. The bore of the laterally translating seal carrier 144, the sealing interface diameter 160 of the lower shaft 126, and the radial cross-section of the resilient squeeze packing seal 158 are dimensioned and toleranced such that contact can not occur between the sealing interface diameter 160 of the shaft 126 and the mating bore of the laterally translating seal carrier 144. In practice, when shaft 126 deflects laterally, the rotary seal 158 serves as an ample radial bearing between the shaft sealing surface 160 and the laterally translating seal carrier 144 and functions to force the laterally translating seal carrier 144 to precisely follow the lateral motion of the shaft sealing surface 160, and thus prevents metal-to-metal contact between the seal carrier and the shaft. The radial load bearing capacity of the rotary seal 158 is amply sufficient to overcome the sliding resistance of the non-rotating seal 150 as it bears against the mating sealing interface surface of the seal carrier due to its material stiffness, and also due to the high friction between the downward side 301 of the rotary seal 158 and the mating surface 302 of the seal carrier gland wall 144. The seal to gland wall friction is the result of the differential pressure forcing the seal 158 against the gland wall 302. Owing to the relatively high radial load bearing capacity of the rotary seal 158, no significant relative lateral motion occurs between the bore of the seal carrier and the lower shaft sealing surface 160, and as a result metal-to-metal contact between said components, and the accompanying potential for damage to the components and to the seal, is avoided.

As in the case of the preferred embodiment of FIG. 2, the sealing members 150 and 158 of the embodiment of FIG. 3 are pressure balancing seals, which define substantially equal pressure responsive seal carrier areas. This feature causes opposed axially directed pressure induced forces acting on the seal carrier 144 to be substantially balanced to thus permit the seal carrier to be laterally movable relative to the pilot 132 and thus able to follow lateral excursions of the sealing surface 160 of the shaft 126 during shaft rotation while maintaining efficient sealing with the shaft and pilot. In the embodiment of FIG. 3, pressure responsive areas A3 and A4 are defined respectively on the seal carrier 144 by sealing elements 150 and 158. Pressure responsive areas A3 and A4 are substantially equal; thus lubricant pressure acting on these substantially equal pressure responsive areas causes opposed axially acting pressure responsive forces to define a net of substantially zero.

The outside diameter 203 of the face sealing squeeze packing type seal groove for seal 150, which defines the effective sealing interface diameter of the resilient sealing member 150, is substantially the same diameter as the cylindrical sealing surface 160 of the rotary shaft 126. The relative diameters of the sealing interface diameter 203 and the diameter of the cylindrical sealing interface surface 160 of the rotary shaft are deemed critical to the performance of the present invention in high differential pressure applications; diameters 203 and 160 must be substantially identical in diametric size, so that no significant differential pressure area exists between the two sealing interface diameters. Since substantially no differential pressure area exists between these two sealing interface diameters, the carrier 144 is substantially hydraulic force balanced so that regardless of the magnitude of the differential pressure acting across the rotary seal 158 and the non-rotary seal 150, no substantial axial hydraulic thrust is imposed on the seal carrier. If a substantial differential area did in fact exist between the rotary seal and the non-rotary seal, as is common in all other present day mud motor squeeze packing type seal implementations, the resulting pressure induced axially acting hydraulic force could ten to hold the carrier in place, and thereby greatly inhibit free lateral motion of the seal carrier. It should be pointed out that a slight difference in diameter between the carrier to shaft sealing interface 160 and the carrier to pilot sealing interface 203 can be intentionally employed to preload the carrier in one axial direction or the other in order to stabilize it in applications which have severe axial vibration, or to reduce the extrusion gap of the sliding high pressure seal 150. The important point of the invention is that the resulting pressure induced loads from any intentional sealing diameter differences are relatively small in comparison to the radial bearing capacity of the rotary shaft seal 158, and do not inhibit the ability of the laterally translating seal carrier 144 to move laterally in unison with the lateral motions of the shaft sealing surface 160, thereby preventing metal-to-metal contact (and resulting damage) between the inside diameter of the seal carrier and the shaft sealing surface 160.

As the shaft 126 rotates, the breakout and running friction of the rotary seal 158 imparts torque to the laterally translating seal carrier 144. The laterally translating seal carrier 144 is maintained in non-rotatable relation with the pilot 132 by means of one or more anti-rotation pin members 152 of the pilot which are received within one or more recesses 154 of the seal carrier. Any one of a number of suitable alternative anti-rotation devices, such as lugs or static seal friction, may be employed without departing from the spirit and scope of this invention.

As the shaft 126 rotates, the breakout and running friction of the rotary seal 158 imparts torque to the pilot 132 via the anti-rotation member 152. A substantial differential area exists between the housing 124 to pilot 132 sealing interface and the pilot 132 to laterally translating seal carrier 144 sealing interface, and as a result the differential pressure acting over this area results in a considerable axial force; this force being reacted to the housing by the retaining ring 136. Relative rotation between the pilot 132 and the lower bearing housing 124 is prevented by the frictional resistance of the static squeeze packing seal 138, and by the friction between the pilot 132, the cylindrical tubular spacer member 134, the retaining ring 136, and the lower bearing housing 124, which results from the unsupported pressure load acting across the sealing interfaces of the inner 150 and outer 138 sealing members. Any one of a number of suitable alternative or auxiliary anti-rotation devices, such as radial pins may also be employed without departing from the spirit and scope of this invention.

The seal carrier recess 142 is filled with a clean lubricant. Partition barrier means is incorporated to maintain separation between the lubricant in the seal carrier recess 142 and the environmental contaminant 201 within which the apparatus is located in order to prevent contaminant packing from occurring within the seal carrier recess 142 which could inhibit lateral motion of the laterally translating seal carrier 144. The squeeze packing seals 150 and 166 are maintained under compression by the retainer ring 164 which is positioned within an internal groove formed in the pilot 132 and which secures the partition seal carrier 162 against downward movement. The pilot 132 is retained against axial movement by the tubular spacer 134 and the retainer ring 136. The partition seal carrier 162 also functions to secure the laterally translating seal carrier 144 against downward movement relative to the pilot. This partition barrier means may conveniently take the form described hereinbelow, or any one of a number of suitable alternative means, such as a partition type rotary shaft seal installation, without departing from the spirit and scope of this invention.

In the embodiment illustrated in FIG. 3 the partition seal carrier 162 defines a circular seal recess within which is received the squeeze packing type circular sealing element 166 which establishes sealing engagement with the lower end surface of the seal carrier element 144. The partition seal carrier 162 also defines a downwardly extending, generally cylindrical sealing member 168. An elongate pressure balancing piston 170 is movably positioned within the cylindrical tubular spacer member 134. The partition seal carrier 170 supports a circular squeeze packing sealing element 172 which establishes sealing engagement with the cylindrical sealing member 168 and also supports a squeeze packing seal member 174 that establishes sealing engagement with the inner spherical surface of the pilot positioning spacer 134. A positive seal is maintained between the pilot positioning spacer 134 and the lower housing 124 by means of a circular squeeze packing sealing element 140. The pressure balancing piston 170 functions as a pressure balancing partition between the clean fluid, typically lubricant, which is present in a clean fluid chamber in which the laterally translating seal carrier is located. The pressure balancing piston 170 serves to isolate the clean fluid from the environmental contaminate fluid in which the mud motor is immersed.

Although the present invention is described and illustrated herein particularly as it relates to mud motors for well drilling it should be born in mind that such is not intended to limit the spirit and scope of the present invention The laterally translating high pressure rotary shaft and sealing mechanism of the present invention will find a wide variety of uses in circumstances where rotary shafts are employed especially when the rotary shafts are subject to a hazardous operational environment and lateral shaft movement.

As can be appreciated from the previous summary of the invention, and from the present description of the laterally translating seal carrier squeeze packing seal implementation set forth in conjunction with the drawings, the invention is of very simple configuration which overcomes all of the problems mentioned previously in respect to present mud motor rotary seal implementations, thus greatly improving the performance, reliability and life of mud motor sealed bearing assemblies, and other similarly difficult rotary sealing applications.

What is claimed:

1. A high pressure rotary shaft sealing mechanism for a rotary shaft of equipment capable of operating in a high pressure fluid environment and having a sealing surface that is subject to lateral excursion during rotation thereof, said rotary shaft sealing mechanism comprising:
    (a) a housing having said rotary shaft located therein and projecting therefrom;
    (b) a pilot being located within said housing;
    (c) a laterally translating seal carrier being disposed within said housing and about said rotary shaft and having at least a portion thereof capable of lateral translation responsive to lateral excursion of said sealing surface of said rotary shaft;
    (d) a first sealing element establishing sealing engagement between said pilot and said laterally translating seal carrier and establishing a first pressure responsive sealing area of said seal carrier; and
    (e) a second sealing element establishing sealing engagement between said laterally translating seal carrier and said sealing surface of said rotary shaft and defining a second pressure responsive area of said seal carrier being substantially equal with said first pressure responsive area, whereby opposed pressure induced hydraulic forces acting axially and oppositely on said first and second pressure responsive areas of said laterally translating seal carrier are substantially balanced and thus said laterally translating seal carrier in substantially free floating and is thus readily movable by shaft induced forces and is capable of simultaneous lateral excursion along with said sealing surface of said rotary shaft to maintain optimum sealing engagement between said second sealing element and said sealing surface of said rotary shaft during all aspects of rotation and lateral excursion thereof.

2. The high pressure rotary shaft sealing mechanism of claim 1, wherein said laterally translating seal carrier comprises:
    (a) a tubular seal carrier element being positioned about said shaft and being sealed by said first sealing element with respect to said point
    (b) said second sealing element being supported by said tubular seal carrier element; and
    (c) said tubular seal carrier element being capable of lateral translation relative to said point in response to lateral excursion of said sealing surface of said rotary shaft while continuously maintaining sealed rotation with said pilot by said first sealing element.

3. The high pressure rotary shaft sealing mechanism of claim 2, wherein:
    said seal carrier being disposed about said rotary shaft, with a part thereof disposed in close proximity with said pilot, said first sealing element establishing a seal between said pilot and said seal carrier.

4. The high pressure rotary shaft sealing mechanism of claim 3, wherein:
    said seal carrier is pivotally articulatable relative to said pilot about said first sealing element.

5. The high pressure rotary shaft sealing mechanism of claim 3, wherein:
said first sealing element establishes centering of said seal carrier with respect to said pilot.

6. The high pressure rotary shaft sealing mechanism of claim 5, wherein:
said second sealing element establishes centering of said seal carrier with respect to said sealing surface of said rotary shaft.

7. The high pressure rotary shaft sealing mechanism of claim 3, wherein:
(a) said seal carrier is of tubular form and defines first and second axial extremities;
(b) said first sealing element establishing centering of said first axial extremity of said seal carrier with respect to said pilot; and
(c) said second sealing element establishing centering of said second axial extremity of said seal carrier with respect to said sealing surface of said rotary shaft.

8. The high pressure rotary shaft sealing mechanism of claim 1, wherein:
said second sealing element defines internal bearing means having lateral force responding relation with said sealing surface of said rotary shaft for said lateral translation of said seal carrier thereby.

9. The high pressure rotary shaft sealing mechanism of claim 8, wherein:
said internal bearing means is defined by said second sealing element.

10. The high pressure rotary shaft sealing mechanism of claim 2, wherein:
(a) said seal carrier is of tubular form and defines an internal seal groove adjacent one extremity thereof, said second sealing element being retained without said internal sealing groove; and
(b) said first sealing element establishing said sealing engagement between said pilot and said seal carrier adjacent the other extremity of said seal carrier, said sealing engagement being such that said seal carrier is capable of pivot-like articulation in the region of said first sealing element while maintaining a sealed relationship with said pilot, thereby permitting shaft induced lateral excursion of said one end of said seal carrier and said second sealing element supported thereby.

11. The high pressure rotary shaft sealing mechanism of claim 10, wherein:
said seal carrier defines an internal diameter surface adjacent said second sealing element which is disposed in closely spaced relation with said sealing surface of said rotary shaft and cooperates therewith to define a minimal extrusion gap for protection of said second sealing element.

12. The high pressure rotary shaft sealing mechanism of claim 11, wherein:
(a) said pilot defines an internal seal support structure forming a seal groove; and
(b) said seal carrier defining an external cylindrical sealing surface adjacent said other end thereof, said first sealing element being received within said seal groove and establishing compression sealing with said external cylindrical sealing surface.

13. The high pressure rotary shaft sealing mechanism of claim 1 wherein:
(a) said pilot forms an internal geometry defining a circular stop shoulder and an internal circular seal groove;
(b) said laterally translating seal carrier being of generally tubular configuration and being disposed about said rotary shaft, said first sealing element being disposed within said internal circular seal groove and establishing a compression seal with said seal carrier adjacent one end thereof, said seal carrier forming a positioning surface disposed for engagement with said stop surface for limiting axial movement of said seal carrier in one direction relative to said pilot;
(c) a retainer being received by said tubular seal carrier and restraining axial movement of said seal carrier in the opposite direction relative to said pilot; and
(d) said tubular seal carrier defining an internal diameter surface adjacent said second sealing element which is disposed in closely spaced relation with said sealing surface of said rotary shaft and cooperates therewith to define a minimal extrusion gap for protection of said second sealing element.

14. The high pressure rotary shaft sealing mechanism of claim 1, wherein:
said first sealing element is a static seal establishing said sealed relation of said laterally translating seal carrier with said pilot, said static seal being of substantially the same sealing area diameter as that of said sealing element and cooperating therewith to substantially balance pressure induced hydraulic forces acting axially on said laterally translating seal carrier, whereby said laterally translating seal carrier is substantially free of axial pressure differential induced force and is readily movable laterally by said rotary shaft at all operating pressures.

15. The high pressure rotary shaft sealing mechanism of claim 14, wherein:
(a) said laterally translating seal carrier is capable of pivotal articulation relative to said pilot at said static seal; and
(b) said static seal maintaining sealing engagement with said pilot and said laterally translating seal carrier during said pivotal articulation thereof.

16. The high pressure rotary shaft sealing mechanism of claim 15, wherein:
said laterally translating seal carrier is of annular form, said second sealing element being interposed between said laterally translating seal carrier and said sealing surface of said rotary shaft.

17. The improvement of claim 1, wherein:
said second sealing element is of hydrodynamic form and is responsive to lubricant pressure developed by shaft rotation to impart lubricant film movement between said second sealing element and said rotary shaft.

18. A high pressure sealing and lubrication assembly for a rotary shaft intended for operation in an abrasive environmental medium having an environmental pressure, wherein said rotary shaft is supported by bearings for rotation and defines a sealing surface thereabout that is subject to lateral translation during rotation of said rotary shaft, said sealing and lubrication assembly comprising:
(a) a housing rotatably receiving said rotary shaft therein and forming a lubricant chamber about said rotary shaft adapted to receive a liquid lubricant;
(b) a pilot being located within said housing;
(c) a seal carrier being disposed about said rotary shaft and having non-rotatable laterally translating movable relation with said housing, said seal carrier having a seal retainer and having a seal support defining a minimal extrusion gap with said rotary shaft;

(d) a static sealing element establishing sealed relation with said pilot and said seal carrier and defining a first pressure responsive area exposed to said lubricant chamber;

(e) a rotary shaft seal establishing sealed relation between said seal carrier and said rotary shaft, said rotary shaft seal establishing a second pressure responsive are substantially equal to and opposing said first pressure responsive area for substantially balancing pressure induced axial force acting on said seal carrier, whereby said rotary shaft seal remains free for lateral translation by said rotary shaft at all ranges of environmental pressure, thus permitting said rotary shaft seal to maintain said sealing engagement with said rotary shaft during all aspects of shaft rotation and lateral translation.

19. The high pressure sealing and lubrication assembly of claim 18, wherein:

(a) said pilot being disposed in sealed relation with said housing and being positioned about said rotary shaft, said pilot forming a lateral sealing interface surface; and (b) means preventing relative rotation of said laterally translating seal carrier and said pilot;

(c) a first sealing element establishing sealing relation between said laterally translating seal carrier and said lateral sealing interface surface and defining a first pressure responsive area of said seal carrier; and (d) a second sealing element establishing a seal between said laterally translating seal carrier and said rotary shaft and establishing a second pressure responsive area of said seal carrier being substantially equal to and axially opposite said first pressure responsive area, whereby pressure acting on said axially opposite first and second pressure responsive areas develops a net axially induced force of substantially zero and said laterally translating seal carrier is substantially pressure balanced and is thus enabled to be readily moved by lateral translations of said rotary shaft substantially free of pressure induced forces.

20. In a mud motor for deep earth boring in the drilling of wells for petroleum products and having a housing a rotary shaft extending from the housing for driving connection with a rotary drill bit, and having a lubricant chamber between said housing said rotary shaft, the improvement comprising:

(a) a pilot being located within said housing;

(b) a laterally translating seal carrier being disposed within said housing and about said rotary shaft;

(c) a first sealing element establishing a sealed relation between said pilot and said laterally translating seal carrier and defining a first axial pressure responsive area of said laterally translating seal carrier; and (d) a second sealing element establishing a sealed relation between said laterally translating seal carrier and said rotary shaft, said second sealing element defining a second axial pressure responsive area of said laterally translating seal carrier being substantially equal and axially opposite said first pressure responsive area, whereby opposing axially directed hydraulically induced forces acting on said laterally translating seal carrier and being developed by the pressure of lubricant within said lubricant chamber and the pressure of drilling fluid in which said mud motor is immersed are substantially balanced and said laterally translating seal carrier is thus free for lateral translation by forces imparted thereto by said rotary shaft and said second sealing element is enabled to maintain optimum sealing engagement with said rotary shaft.

21. The improvement of claim 20, wherein said laterally translating seal carrier comprises:

(a) said laterally translating seal carrier being sealed by said first sealing element with respect to said pilot (b) said second sealing element being supported by said seal carrier; and (c) said seal carrier being capable of lateral translation relative to said pilot in response to lateral excursion of said sealing surface of said rotary shaft while continuously maintaining sealed relation with said pilot by said first sealing element.

22. The improvement of claim 21, wherein:

said seal carrier being disposed about said rotary shaft, with a part thereof disposed in close proximity with said pilot, said first sealing element establishing a seal between said pilot and said seal carrier.

23. The improvement of claim 22, wherein:

said seal carrier is pivotally articulatable relative to said pilot about said first sealing element.

24. The improvement of claim 21, wherein:

said first sealing element establishes centering of said seal carrier with respect to said pilot.

25. The improvement of claim 24, wherein:

said second sealing element establishes centering of said seal carrier with respect to said sealing surface of said rotary shaft.

26. The improvement of claim 21, wherein:

(a) said seal carrier being of tubular form and defining first and second axial extremities;

(b) said first sealing element establishing centering of said first axial extremity of said seal carrier with respect to said pilot; and (c) said second sealing element establishing centering of said second axial extremity of said seal carrier with respect to said sealing surface of said rotary shaft.

27. The improvement of claim 20, wherein:

said seal carrier defines an internal bearing having lateral force responding relation with said sealing surface of said rotary shaft for said lateral translation of said seal carrier thereby.

28. The improvement of claim 27, wherein:

said internal bearing means is defined by said second sealing element.

29. The improvement of claim 21, wherein:

(a) said seal carrier is of tubular form and defines an internal seal groove adjacent one extremity thereof, said second sealing element being retained within said internal sealing groove; and (b) said first sealing element establishing said sealing engagement between said pilot and said seal carrier adjacent the other extremity of said seal carrier, said sealing engagement being such that said seal carrier is capable of pivot-like articulation in the region of said first sealing element, thereby permitting shaft induced lateral excursion of said one end of said seal carrier and said second sealing engagement supported thereby.

* * * * *